United States Patent
Koide

(10) Patent No.: US 8,051,137 B2
(45) Date of Patent: Nov. 1, 2011

(54) MULTIFUNCTIONAL INPUT/OUTPUT DEVICE

(75) Inventor: Yasuhisa Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 12/267,217

(22) Filed: Nov. 7, 2008

(65) Prior Publication Data

US 2009/0125599 A1  May 14, 2009

(30) Foreign Application Priority Data

Nov. 12, 2007 (JP) ................................ 2007-293493

(51) Int. Cl.
G06F 12/16 (2006.01)
(52) U.S. Cl. ........... 709/206; 709/220; 709/224; 707/10
(58) Field of Classification Search .................. 709/206, 709/224, 228, 223; 707/7; 713/154
See application file for complete search history.

(56) References Cited

U.S. PATENT DOCUMENTS

| | | | |
|---|---|---|---|
| 6,266,692 B1 * | 7/2001 | Greenstein .................... 709/206 |
| 6,453,419 B1 * | 9/2002 | Flint et al. ......................... 726/3 |
| 6,665,726 B1 * | 12/2003 | Leighton et al. ............. 709/231 |
| 6,823,367 B1 | 11/2004 | Wakasugi et al. | |
| 6,882,438 B1 | 4/2005 | Kanaya | |
| 6,883,000 B1 * | 4/2005 | Gropper ................................. 1/1 |
| 7,103,633 B1 | 9/2006 | Malik | |
| 7,180,638 B1 | 2/2007 | Hou et al. | |
| 7,199,906 B1 | 4/2007 | Tamura | |
| 7,328,258 B2 | 2/2008 | Koide et al. | |
| 7,363,490 B2 * | 4/2008 | Paulsen et al. ................. 713/154 |
| 2003/0023589 A1 * | 1/2003 | Castle ................................. 707/5 |
| 2004/0054887 A1 * | 3/2004 | Paulsen et al. ................. 713/154 |
| 2005/0091490 A1 * | 4/2005 | Ogura ............................. 713/165 |
| 2005/0168776 A1 * | 8/2005 | Yamaguchi ................... 358/1.15 |
| 2005/0289149 A1 * | 12/2005 | Carro ............................... 707/10 |
| 2006/0101124 A1 * | 5/2006 | Landis ........................... 709/206 |
| 2006/0268349 A1 | 11/2006 | Tamura | |

FOREIGN PATENT DOCUMENTS

| | | |
|---|---|---|
| JP | 2001-109772 | 4/2001 |
| JP | 2002-319978 | 10/2002 |
| JP | 2003-76711 | 3/2003 |
| JP | 2003-157218 | 5/2003 |
| JP | 2004-56528 | 2/2004 |
| JP | 2004-171173 | 6/2004 |
| JP | 3615750 | 11/2004 |
| JP | 2004-356822 | 12/2004 |
| JP | 2005-222207 | 8/2005 |
| JP | 2005-327033 | 11/2005 |
| JP | 2006-157412 | 6/2006 |

* cited by examiner

Primary Examiner — Khanh Dinh
(74) Attorney, Agent, or Firm — Cooper & Dunham LLP

(57) ABSTRACT

A disclosed multifunctional input/output device has an e-mail client function for sending/receiving e-mails to/from a mail server. The multifunctional input/output device includes a storing unit configured to store a first e-mail acquired from the mail server; a printing unit configured to print the first e-mail stored by the storing unit onto a print medium and to add code information to the print medium, wherein the code information is obtained by encoding a source e-mail address of the first e-mail; a reading unit configured to read the code information printed onto the print medium by the printing unit; and an e-mail sending unit configured to send a second e-mail to the source e-mail address acquired from the code information read by the reading unit.

15 Claims, 13 Drawing Sheets

| 1001 | 1002 | 1003 | 1004 | 1005 | 1006 | 1007 |
|---|---|---|---|---|---|---|
| ID | RECEPTION TIME | RECEPTION E-MAIL ADDRESS | SENDER E-MAIL ADDRESS | SUBJECT | BODY | ATTACHMENT FILE |
| F15151230 | 20070320110155 | req001@ricoh.co.jp | 1234@ricoh.jp | I am a regular listener. | Today, I climbed Mt. Fuji... | 070320110155.jpg |
| F15151231 | 20070320110159 | req001@ricoh.co.jp | 5432@aaa.ne.jp | Hello | Hello Hanako, I always enjoy... | 070320110159.jpg |
| F15151232 | 20070320110220 | req001@ricoh.co.jp | 0333334444 | That song | When I heard that song, memories came to me... | |
| :...... | ...... | ...... | ...... | ...... | ...... | ...... |
| :...... | ...... | ...... | ...... | ...... | ...... | ...... |
| F15152305 | 20070320115959 | req001@ricoh.co.jp | sck@bcd.ne.jp | Shopping song | The weather is fine so I went out shopping... | 070320115959.jpg |
| F15152306 | 20070320115959 | req001@ricoh.co.jp | kbhcog@ric.co.jp | Good night | My son is sound asleep... | |

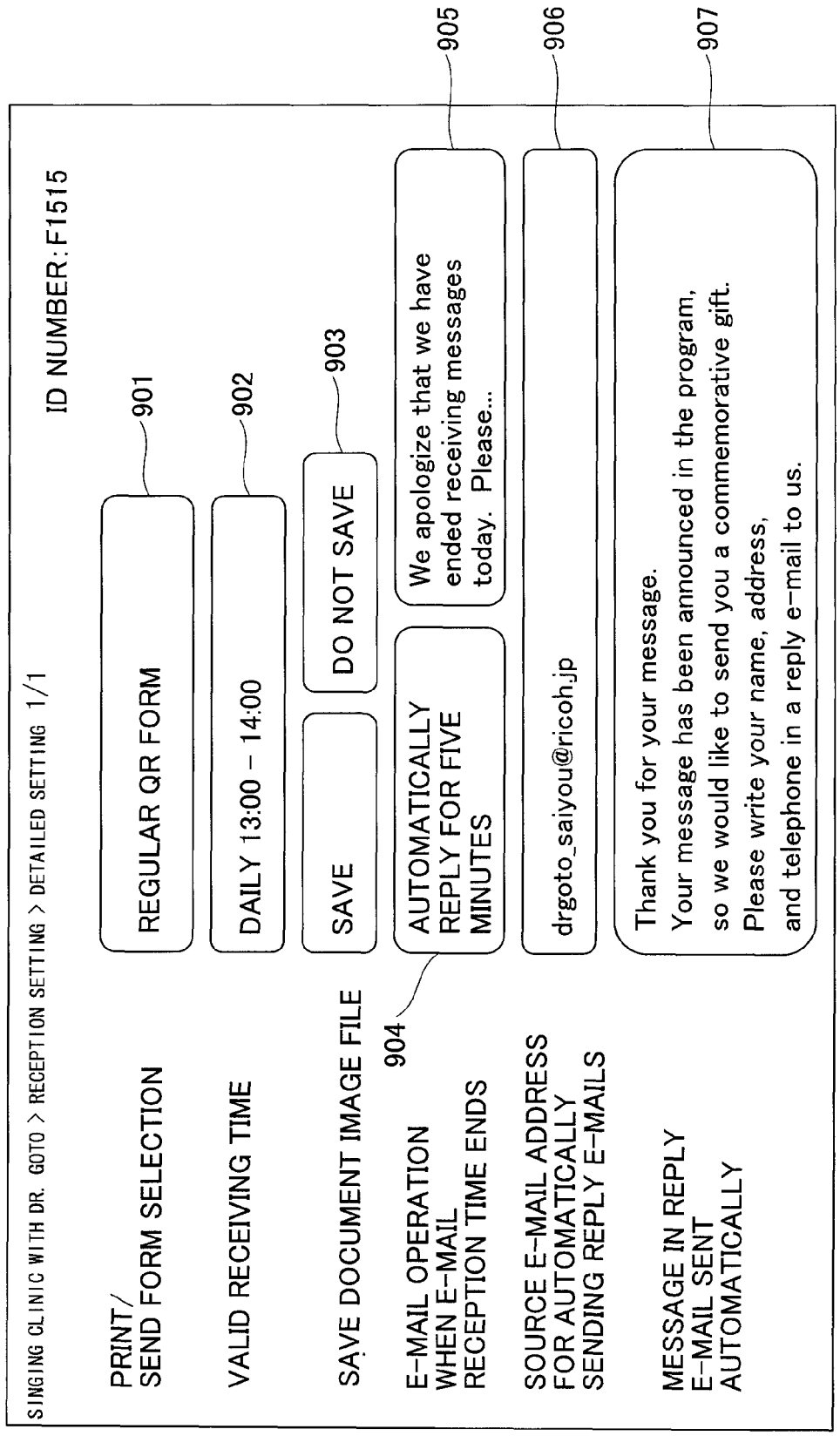

FIG.10

| ID | RECEPTION TIME | RECEPTION E-MAIL ADDRESS | SENDER E-MAIL ADDRESS | SUBJECT | BODY | ATTACHMENT FILE |
|---|---|---|---|---|---|---|
| F15151230 | 20070320110155 | req001@ricoh.co.jp | 1234@ricoh.jp | I am a regular listener. | Today, I climbed Mt. Fuji... | 070320110155.jpg |
| F15151231 | 20070320110159 | req001@ricoh.co.jp | 5432@aaa.ne.jp | Hello | Hello Hanako, I always enjoy... | 070320110159.jpg |
| F15151232 | 20070320110220 | req001@ricoh.co.jp | 03333334444 | That song | When I heard that song, memories came to me... | |
| ... | ...... | ...... | ...... | ...... | ...... | ...... |
| ... | ...... | ...... | ...... | ...... | ...... | ...... |
| F15152305 | 20070320115959 | req001@ricoh.co.jp | sck@bcd.ne.jp | Shopping song | The weather is fine so I went out shopping... | 070320115959.jpg |
| F15152306 | 20070320115959 | req001@ricoh.co.jp | kbhcog@ric.co.jp | Good night | My son is sound asleep... | |

```
<requestpram>
      <programname>dr_goto<programname>
      <id>F15151230</id>
</requestpram>
```

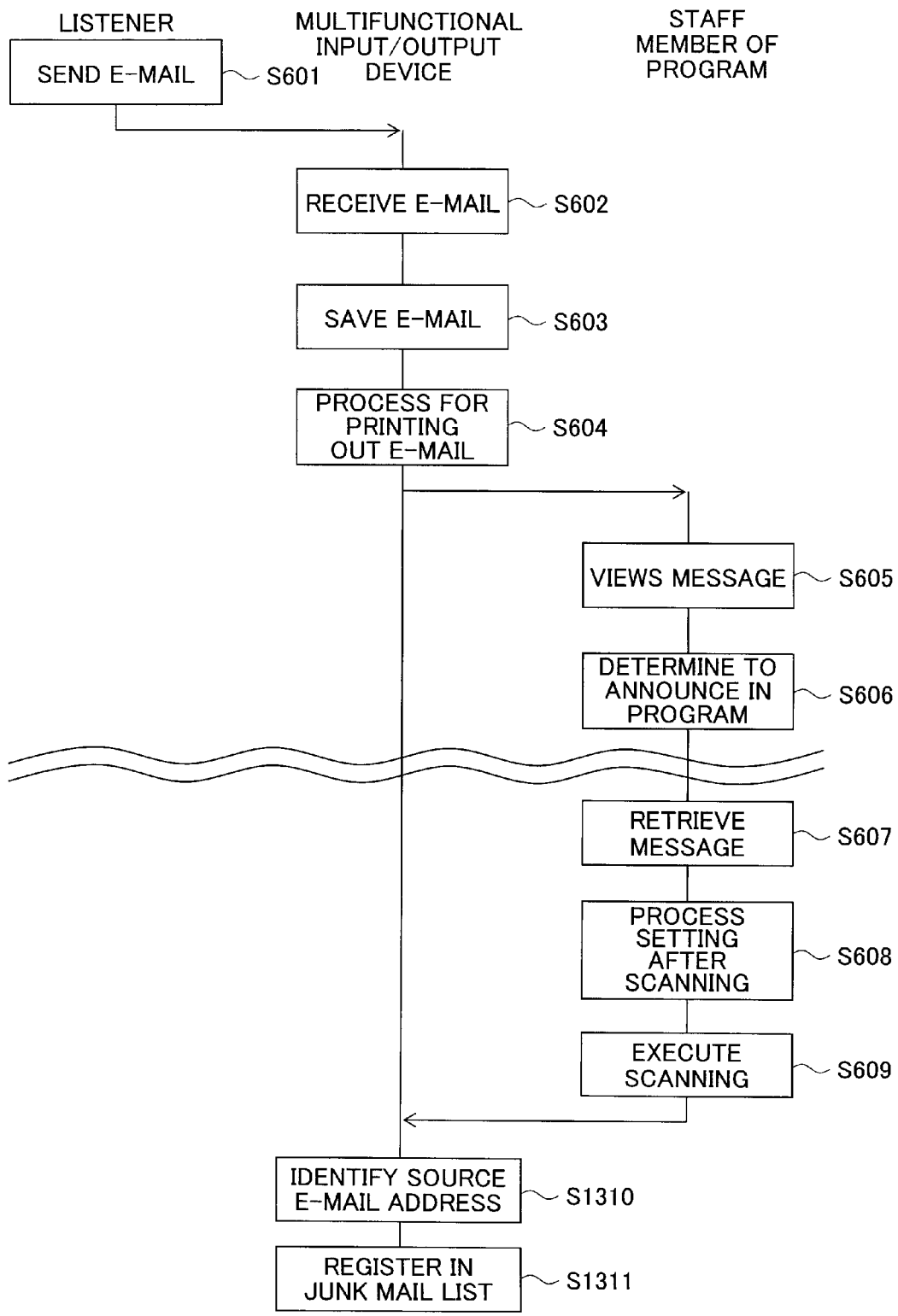

MULTIFUNCTIONAL INPUT/OUTPUT DEVICE

BACKGROUND

1. Technical Field

This disclosure relates to the field of multifunctional input/output devices.

2. Description of the Related Art

Conventionally, there are widely popular television programs/radio programs that announce the contents of messages/postcards which have been received beforehand from viewers/listeners. Due to the pervasiveness of the Internet in recent years, viewers and listeners are starting to send messages via websites on the Internet and e-mails instead of sending letters and postcards by mail. A viewer/listener can access a website of a television/radio program from his/her terminal connected via the Internet, to request music or post messages such as feedback and opinions on the program. Accordingly, more messages are being received, thus making television/radio programs more exciting.

The following is an outline of operations performed by television/radio stations to process such messages received from viewers/listeners via the Internet. FIG. 1 illustrates an example of a flow from when a listener posts a message to the radio program until the message is announced. A listener 101 of a radio program listens to the radio program with a radio terminal 102 and finds out the e-mail address for sending messages. Then, the listener 101 sends a message from a mobile phone 103 or a personal computer 104. The message can be sent with an e-mail client or with a message form in the website of the program. The e-mail message is sent through the Internet and arrives at a mail server 105 to which the e-mail account of the program belongs. A staff member 106 of the program (assistant etc. of the program) uses a personal computer 107 installed with e-mail client software to acquire the e-mail message from the mail server, and prints out the e-mail message with a printer 108. The staff member 106 decides whether to announce the message and make additions/corrections according to need. Then, the printed message is handed to the host of the radio program as a manuscript. This is a typical workflow for receiving the contents of a message by e-mail, printing out the message on a paper medium, and delivering the message to the host.

Patent document 1 discloses a system for performing operations from receiving an e-mail message to printing out the message with the use of an image processing device installed with a general-purpose OS and an e-mail client. This system analyzes the header of the received e-mail, and automatically prints out the body of the e-mail that has been received by the mail server, from the starting time to the ending time of the broadcast program. Additionally, there is a function for preventing the image processing device from printing out an e-mail that has been determined as spam mail by the mail server and e-mail messages that have been repeatedly received from the same source address. Accordingly, the human user does not need to perform the task of discriminating such e-mails.

Patent Document 1: Japanese Laid-Open Patent Application No. 2004-356822

However, with the invention disclosed in patent document 1, in order to return a thank-you note by reply mail to the listener whose message has been announced in the program, the human user needs to recognize the name and the e-mail address of the viewer/listener from the paper printout, and input the return address in a separate personal computer. Additionally, as to spam control, when an e-mail includes inappropriate contents, and the television/radio station desires to prohibit any subsequent e-mail messages from the corresponding e-mail address, determinations made by the mail server may be inadequate for taking flexible measures. Specifically, in order to prevent unwanted junk mail, the human user needs to manually operate the image processing device to add such e-mail addresses to a junk mail list.

BRIEF SUMMARY

In an aspect of this disclosure, there is provided a multifunctional input/output device which facilitates the process of returning e-mails based on a paper printout and registering specific source addresses to an e-mail list such as a junk mail list.

According to another aspect, there is provided a multifunctional input/output device having an e-mail client function for sending/receiving e-mails to/from a mail server, the multifunctional input/output acquired device including a storing unit configured to store a first e-mail from the mail server; a printing unit configured to print the first e-mail stored by the storing unit onto a print medium and to add code information to the print medium, wherein the code information is obtained by encoding a source e-mail address of the first e-mail; a reading unit configured to read the code information printed onto the print medium by the printing unit; and an e-mail sending unit configured to send a second e-mail to the source e-mail address acquired from the code information read by the reading unit.

According to another aspect, there is provided a multifunctional input/output device having an e-mail client function for sending/receiving e-mails to/from a mail server, the multifunctional input/output device including a first storing unit configured to store an e-mail acquired from the mail server; a second storing unit configured to store a mail list in which e-mail addresses of specific senders are registered; a printing unit configured to print the e-mail stored by the first storing unit onto a print medium and to add code information to the print medium in the event that a source e-mail address of the e-mail stored by the first storing unit is not included in the mail list, wherein the code information is obtained by encoding the source e-mail address of the e-mail; a reading unit configured to read the code information printed onto the print medium by the printing unit; and a mail list adding unit configured to add, to the mail list, the source e-mail address acquired from the code information read by the reading unit.

According to another aspect, there is provided an e-mail sending method performed by a multifunctional input/output device having an e-mail client function for sending/receiving e-mails to/from a mail server, the e-mail sending method including a storing step of storing a first e-mail acquired from the mail server; a printing step of printing the first e-mail stored at the storing step onto a print medium and to add code information to the print medium, wherein the code information is obtained by encoding a source e-mail address of the first e-mail; a reading step of reading the code information printed onto the print medium at the printing step; and an e-mail sending step of sending a second e-mail to the source e-mail address acquired from the code information read at the reading step.

According to another aspect, a multifunctional input/output device is provided, which facilitates the process of returning e-mails based on a paper printout and registering specific source addresses to an e-mail list such as a junk mail list.

BRIEF DESCRIPTION OF THE DRAWINGS

Other aspects, features and advantages will become more apparent from the following detailed description when read in conjunction with the accompanying drawings, in which:

FIG. 9 illustrates an example of a setting screen of a display panel;

FIG. 10 illustrates examples of saved e-mails that have been received;

FIG. 12 is an example of a QR code (registered trademark) described in XML; and

FIG. 13 illustrates an example of a flow of a process according to an embodiment of this disclosure.

DETAILED DESCRIPTION OF THE PREFERRED EMBODIMENTS

A description is given, with reference to the accompanying drawings, of an embodiment of this disclosure.

(Overview and Structure of Multifunctional Input/Output Device)

Figure 1:
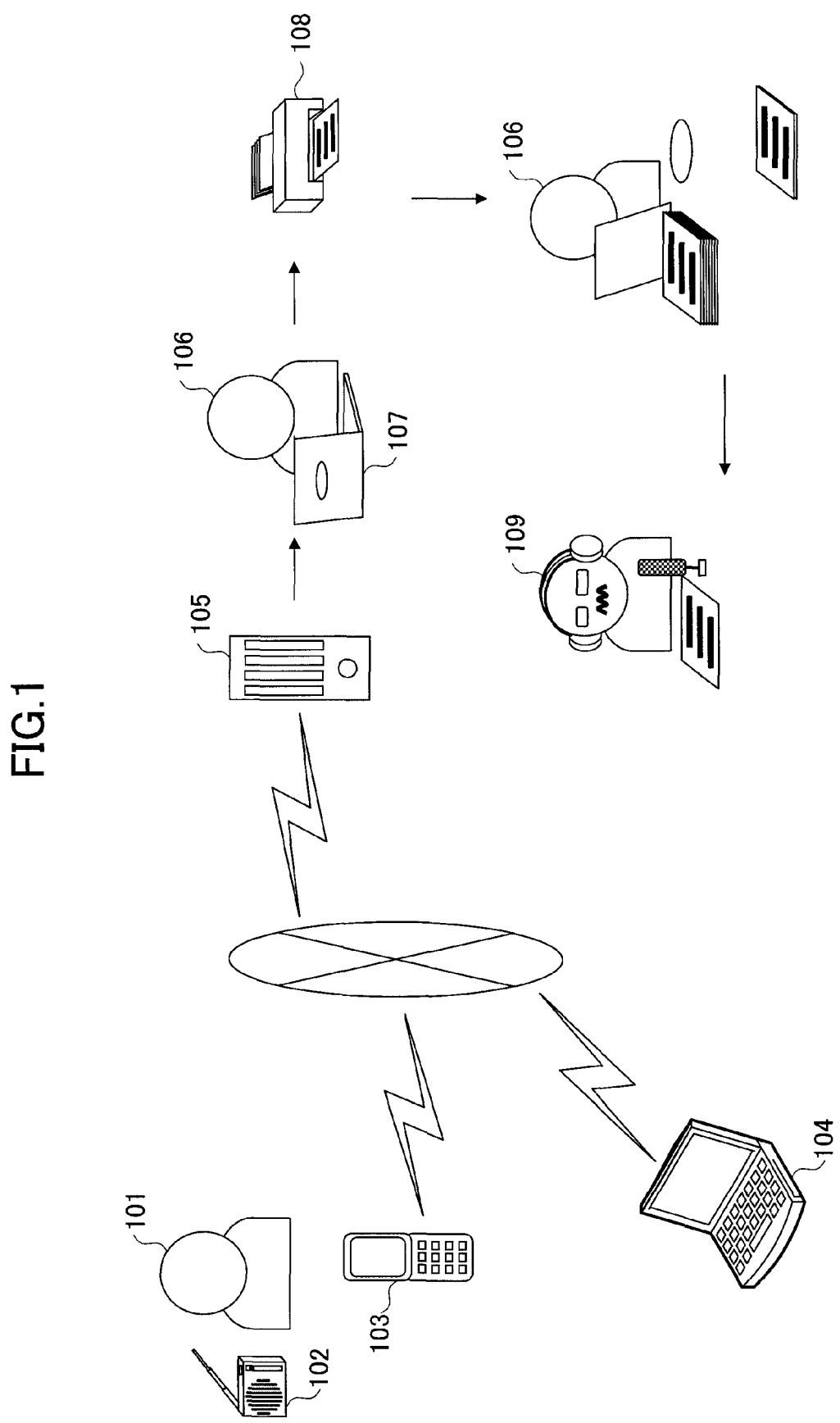
FIG. 1 illustrates a flow for receiving messages from listeners of a radio program.
Figure 2:
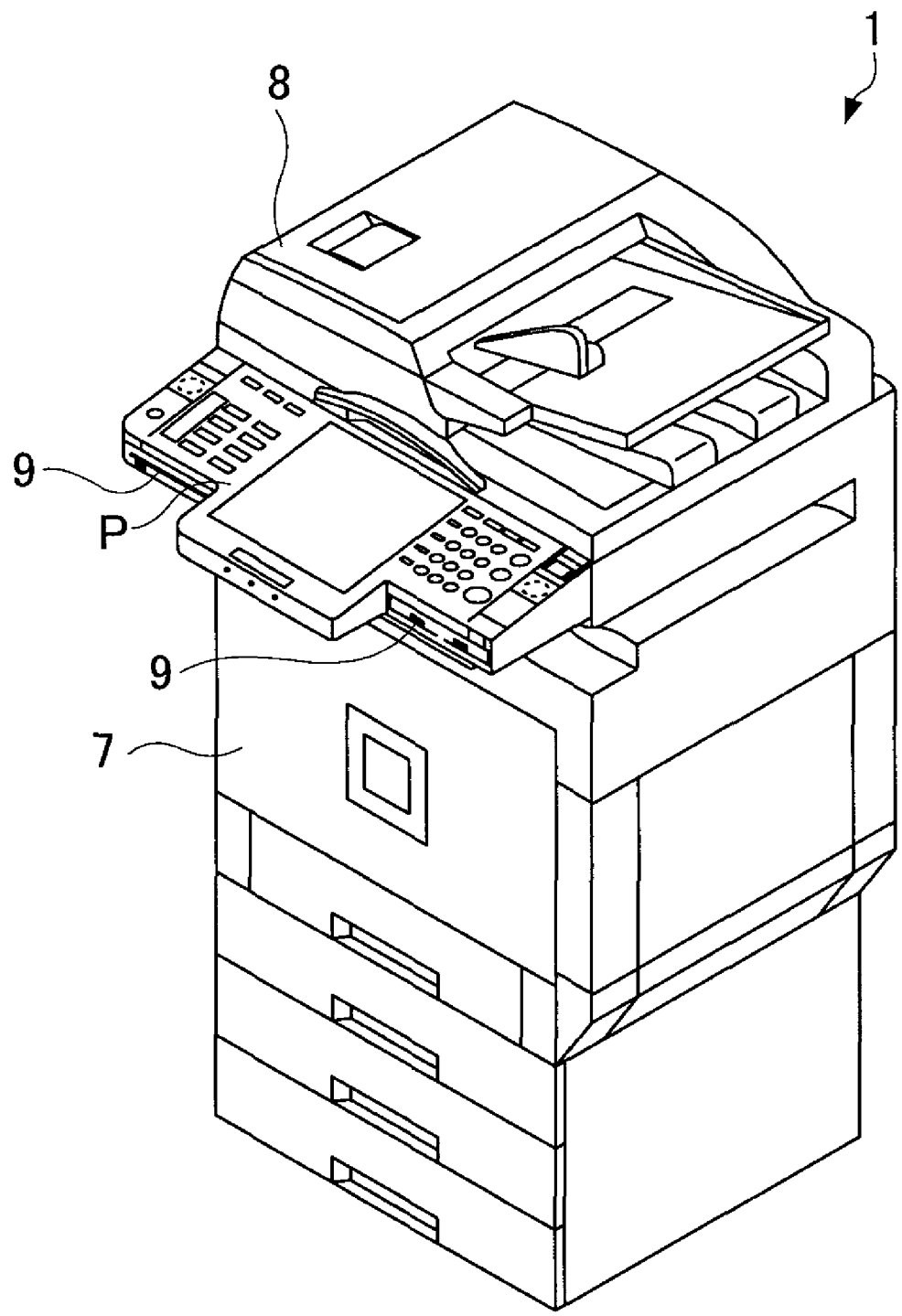
FIG. 2 is a perspective view of a multifunctional input/output device according to an embodiment of this disclosure.

First, before giving detailed descriptions of this disclosure, a brief description is given of a multifunctional input/output device according to an embodiment of this disclosure with reference to FIG. 2. FIG. 2 is a perspective view of a multifunctional input/output device 1. The multifunctional input/output device 1 is a digital color MFP (Multi-Function Peripheral) including a copier function, a fax function, a printer function, a scanner function, and a function for delivering input images.

The multifunctional input/output device 1 has an image scanning device 8, which is an image scanning unit for scanning an image from an original, provided on top of a printer device 7, which is an image forming unit for forming images onto media such as transfer sheets. On the outer surface of the image scanning device 8, there is provided an operation panel P for displaying information to the operator and for allowing the operator to input various information items such as function settings. Furthermore, beneath the operation panel P, there is provided an external media input/output device 9, with its insertion opening exposed to the outside for inserting a recording media M. The external media input/output device 9 is for reading a program code and image data stored in a recording media M, and writing a program code and image data into the recording media M.

Figure 3:
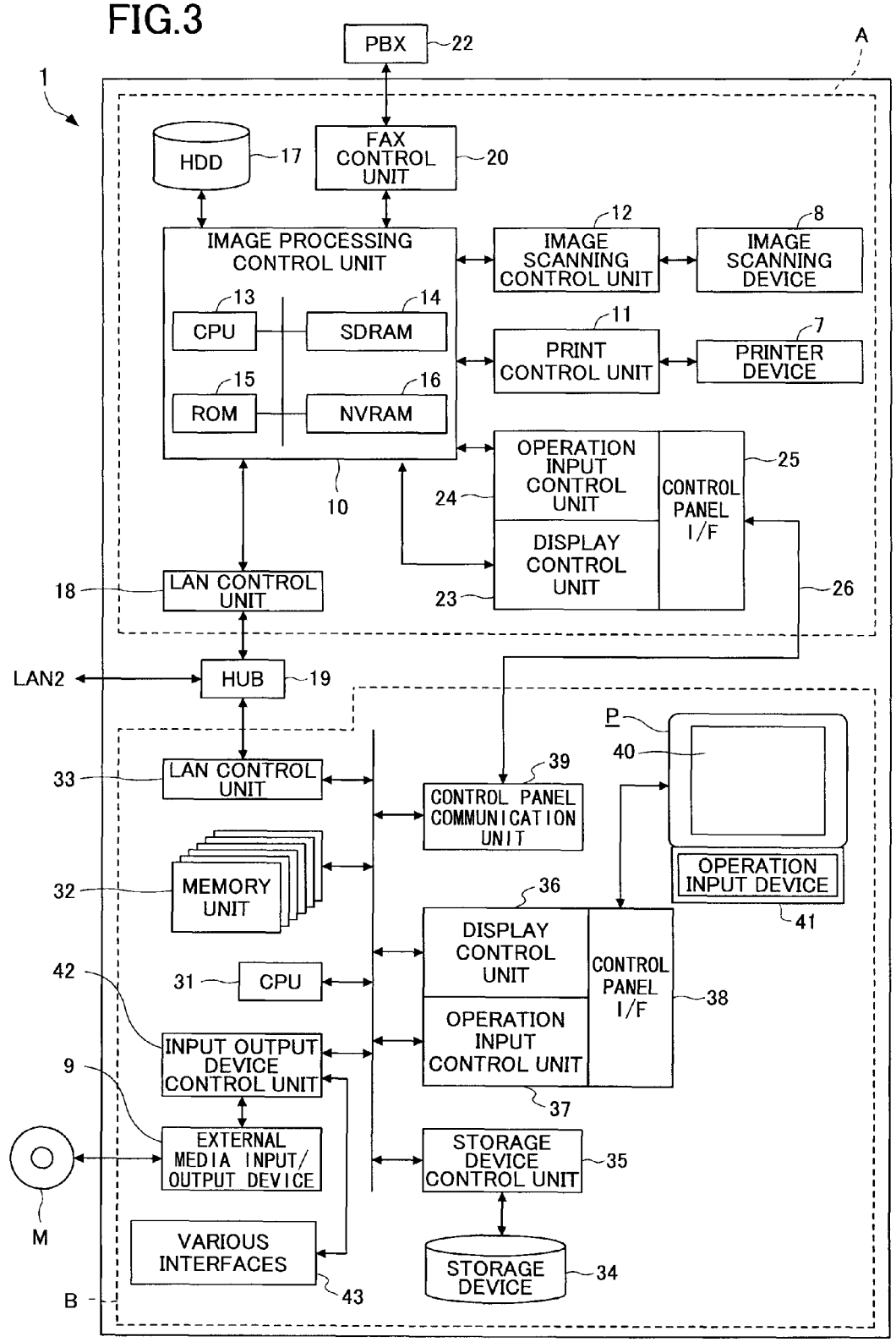
FIG. 3 is a block diagram of the multifunctional input/output device according to an embodiment of this disclosure.

FIG. 3 is a block diagram of the multifunctional input/output device 1. The multifunctional input/output device 1 can be roughly divided into an image processing unit A and an information processing unit B. The printer device 7 and the image scanning device 8 belong to the image processing unit A, and the operation panel P and the external media input/output device 9 belong to the information processing unit B.

A description is given of the image processing unit A. The image processing unit A, which includes the printer device 7 and the image scanning device 8, is provided with an image processing control unit 10 for controlling the entire image processing operation in the image processing unit A. A print control unit 11 for controlling the printer device 7 and an image scanning control unit 12 for controlling the image scanning device 8 are connected to the image processing control unit 10. By being controlled by the image processing control unit 10, the print control unit 11 outputs a printing instruction including image data to the printer device 7, for causing the printer device 7 to form an image on a medium such as a transfer sheet and to output the transfer sheet. By being controlled by the image processing control unit 10, the image scanning control unit 12 drives the image scanning device 8 for radiating light from a lamp onto the surface of an original, causing the light reflected from the original to focus at a light receiving element (for example, a CCD (charge-coupled device) with the use of mirrors and lenses, reading the focused light, and performing A/D conversion on the read light, thereby generating digital image data of RGB, with each color corresponding to 8 bits. This image processing control unit 10 is a microcomputer including the following elements which are interconnected by a bus: a CPU (Central Processing Unit) 13 which is the main processor; a memory device (for example, SDRAM (Synchronous Dynamic Random Access Memory)) 14 for temporarily storing the image data scanned by the image scanning device 8 so that the image data can be used for image creation performed by the printer device 7; a ROM (Read Only Memory) 15 storing control programs, etc.; and an NVRAM 16 that can hold data such as a system log/system setting/log information even while the power is turned off. Furthermore, a HDD (Hard Disk Drive) 17 for accumulating a large amount of image data or for storing job history; a LAN control unit 18 for connecting the image processing unit A to a LAN 2 via a HUB 19 which is a line concentrator provided inside the multifunctional input/output device 1; and a fax control unit 20 for controlling the fax function are connected to the image processing control unit 10. This fax control unit 20 is connected to a private branch exchange (PBX) 22 that is connected to a public telephone network, so that the multifunctional input/output device 1 can communicate with a remote fax machine. Furthermore, a display control unit 23 and an operation input control unit 24 are connected to the image processing control unit 10. By being controlled by the image processing control unit 10, the display control unit 23 outputs an image display control signal to the information processing unit B via a communication cable 26 connected to a control panel I/F 25 to control the images displayed on the operation panel P of the information processing unit B. By being controlled by the image processing control unit 10, the operation input control unit 24 inputs an input control signal via the communication cable 26 connected to the control panel I/F 25. This input control signal corresponds to function settings and input operations input by the operator from the operation panel P of the information processing unit B. That is, the image processing unit A is configured to directly monitor the operation panel P of the information processing unit B via the communication cable 26. By connecting the communication cable 26 to an image processing unit provided in a conventional multifunctional input/output device, the image processing unit A is configured to use the operation panel P of the information processing unit B. Specifically, the display control unit 23 and the operation input control unit 24 of the image processing unit A operate as if they are connected to the operation panel P. With such a configuration, the image processing unit A analyzes print data which is image information received from external devices (server computer, client, computer, fax machines, etc.) and commands for instructing printing operations, develops the print data into a bitmap that can be printed out as output image data, analyzes the print mode from the commands, and determines the operation. The print data and commands are received through the LAN control unit 18 or the fax control unit 20, to perform the operation. Furthermore, the image processing unit A can transfer the following data outside: print data stored in the SDRAM 14 and the HDD 17; data obtained by scanning an original; output image data obtained by processing this data so that they can be output; and compressed data obtained by compressing this data.

Next, a description is given of the information processing unit B provided with the operation panel P. The information processing unit B is controlled by a general-purpose OS (Operating System) used in an information processing device that is generally referred to as a personal computer. The information processing unit B includes a CPU 31 which is the main processor. A memory unit 32 including a RAM that is the work area of the CPU 31 and a ROM that is a read-only memory storing boot programs, and a storage device control unit 35 for controlling input and output of data with respect to a storage device 34 such as a HDD storing the OS (Operating System) and application programs, are connected to the CPU 31 with a bus. A LAN control unit 33 for connecting the information processing unit B to the LAN 2 via the HUB 19 is also connected to the CPU 31. An IP address which is a network address assigned to the LAN control unit 33 is different from the IP address assigned to the above-described LAN control unit 18 of the image processing unit A. That is, two IP addresses are assigned to the multifunctional input/output device 1 according to the present embodiment. Both the image processing unit A and the information processing unit B are connected to the LAN 2. Thus, the image processing unit A and the information processing unit B can exchange data. Furthermore, a display control unit 36 for controlling the operation panel P and an operation input control unit 37 are connected to the CPU 31. An input output device control unit 42 controls the input and output of the external media input/output device 9 for scanning the recording media M or other media and various interfaces 43.

Figure 4:
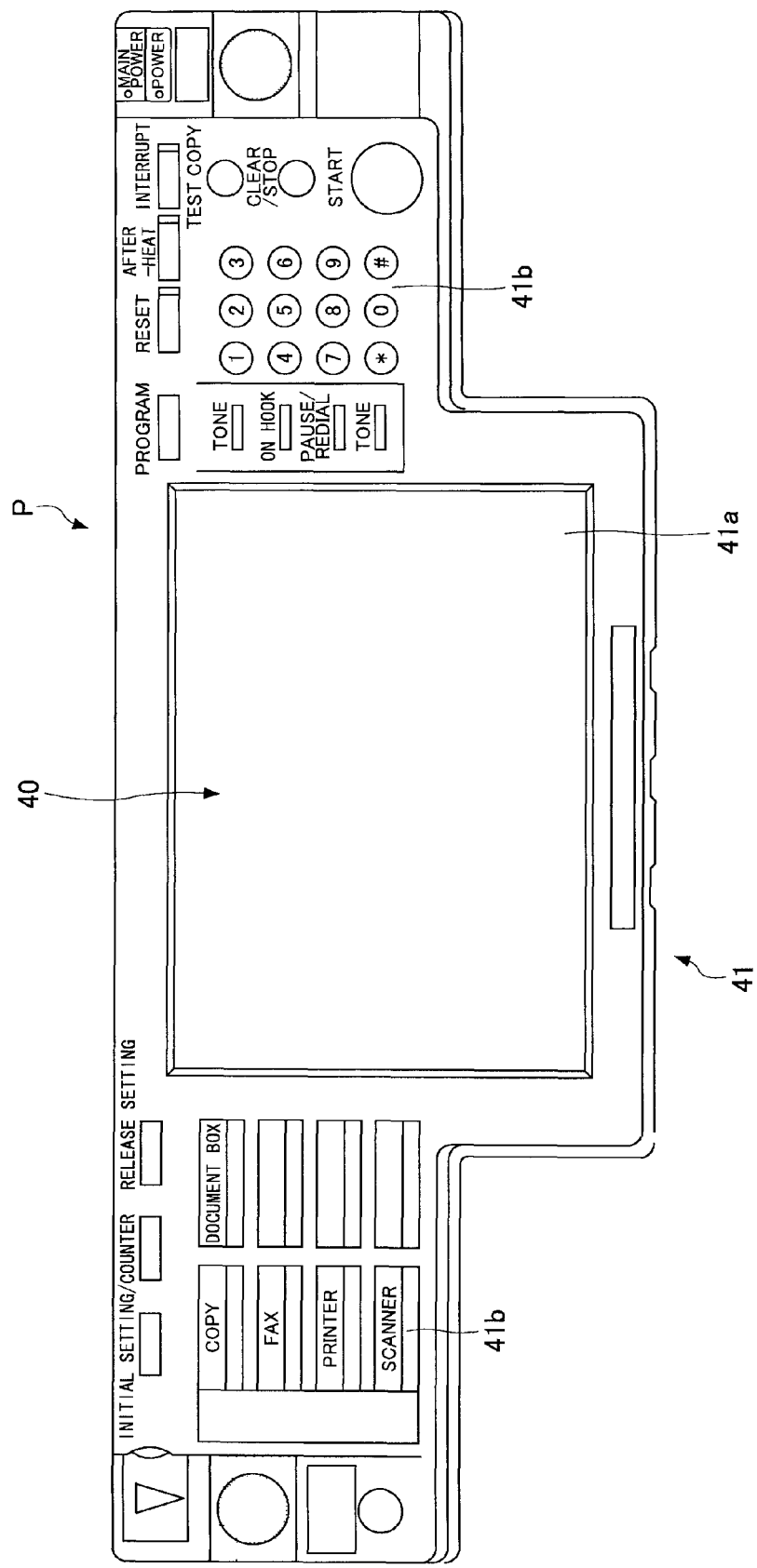
FIG. 4 is a top view of an operation panel of the multifunctional input/output device according to an embodiment of this disclosure.

FIG. 4 is a top view of the operation panel P. As shown in FIG. 4, the operation panel P includes a display device 40 which is, for example, an LCD (Liquid Crystal Display), and an operation input device 41. The operation input device 41 includes a touch panel 41*a*, which is implemented by an ultrasound elasticity method, laminated on the surface of the display device 40, and a keyboard 41*b* with plural keys. The keyboard 41*b* includes a start key for initiating the start of image scanning, numeric keys for inputting numeric values, scanning condition setting keys for setting the destination of the scanned image data, and a clear key. The display control unit 36 outputs image display control signals to the display device 40 via a control panel I/F 38, and causes the display device 40 to display specific items corresponding to the image display control signals.

Meanwhile, the operation input control unit 37 receives, via the control panel I/F 38, the input control signals corresponding to function settings and input operations input by the operator at the operation input device 41. In addition, a control panel communication unit 39, which is connected to the control panel I/F 25 of the image processing-unit A via the communication cable 26, is connected to the CPU 31. The control panel communication unit 39 receives an image display control signal output from the image processing unit A, and transfers, to the image processing unit A, an input control signal corresponding to function settings and input operations input by the operator from the operation panel P. The image display control signal from the image processing unit A received at the control panel communication unit 39 is subjected to a data conversion process for the display device 40 of the operation panel P, and is then output to the display control unit 36. Furthermore, the input control signal corresponding to function settings and input operations input by the operator from the operation panel P is subjected to a data conversion process so as to be in a format in accordance with the specifications of the image processing unit A, and is then input to the control panel communication unit 39. As described above, the OS (Operating System) and application programs executed by the CPU 31 are stored in the storage device 34. Thus, the storage device 34 functions as a storage medium for storing application programs. When a user turns on the power of the multifunctional input/output device 1, the CPU 31 boots a boot program in the memory unit 32 and loads the OS from the storage device 34 into a RAM in the memory unit 32 to boot this OS. This OS can boot programs in response to the user's operation, and read and save information.

(Module Configuration of Multifunctional Input/Output Device)

Figure 5:
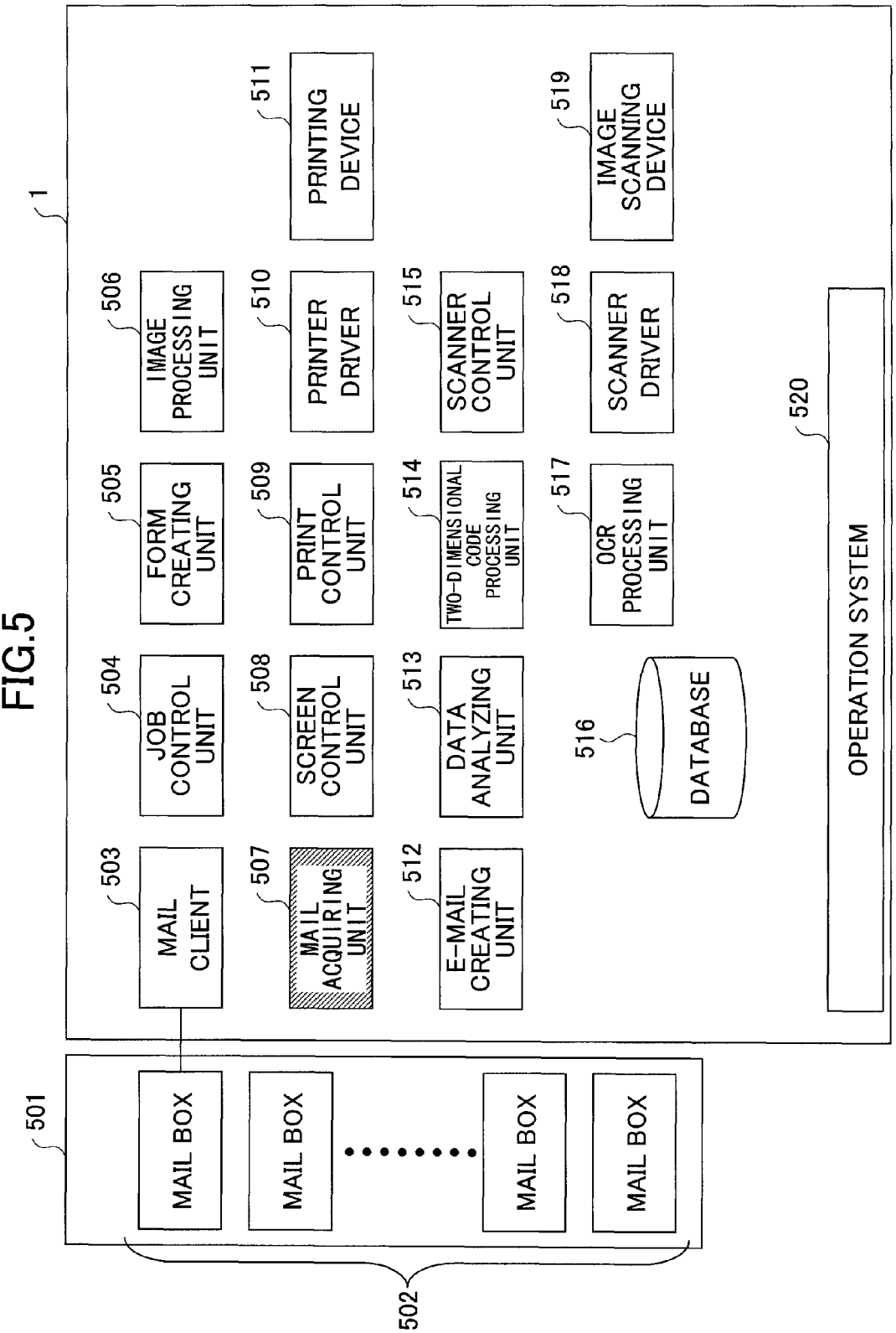
FIG. 5 illustrates a module configuration of the multifunctional input/output device according to an embodiment of this disclosure.

FIG. 5 illustrates the module configuration of the multifunctional input/output device 1 connected to a mail server 501 via a network. A brief description is given of the functions of the multifunctional input/output device 1 with reference to FIG. 5.

The mail server 501 is for receiving messages for a radio program sent from listeners as e-mails. Separate mail accounts are provided for different programs, and therefore the mail server 501 holds plural mail boxes 502. Each of the mail boxes 502 is created for one of the mail accounts. E-mail messages from listeners are temporarily stored in the mail boxes 502 of the mail server 501.

A mail acquiring unit 507 of the multifunctional input/output device 1 receives an e-mail upon switching the mail account set in a mail client 503 according to a specified time schedule. A job control unit 504 is a module for analyzing data of a received e-mail, creating a print form, and giving instructions by controlling process units referred to as jobs such as a printing job and a scanning job. A form creating unit 505 generates a file to act as an output layout by inserting the header, subject, body, images, etc. of a received e-mail into a specific format. An image processing unit 506 is used when it is necessary to perform image processing on an attached file when creating a form. A screen control unit 508 is a module for generating a screen related to user operations. The digital color MFP according to the present embodiment generates a screen to be displayed on the touch panel shown in FIG. 4. A print control unit 509 makes settings such as the print color, the sheet size, and the output tray in a printer driver 510, and a printing device 511 executes a printing operation. An e-mail creating unit 512 is a module for creating the e-mail contents when creating a reply e-mail to the listener. A data analyzing unit 513 performs a full-text search of the character strings in a received e-mail, and detects keywords and geographic names. For example, the data analyzing unit 513 performs a process to create a ranking list based on the detection ratio of a certain keyword. A two-dimensional code processing unit 514 is a module for creating a two-dimensional code to be added to a printout of a form, and analyzing a scanned image to read the data of a two dimensional code included in the scanned image, whereby the scanned image is obtained with the use of an image scanning device 519 for optically scanning an original, a scanner driver 518, and a scanner control unit 515. A database 516 is for storing information of received e-mails and pertinent attribute information. An OCR processing unit 517 recognizes characters from a scanned image obtained with the use of the image scanning device 519 for optically scanning an original, the scanner driver 518, and the scanner control unit 515. Furthermore, each function module is designed to operate on an operation system 520.

The above briefly describes the module configuration of the multifunctional input/output device 1. Next, a description is given of specific contents of embodiments of this disclosure.

First Embodiment

Figure 6:
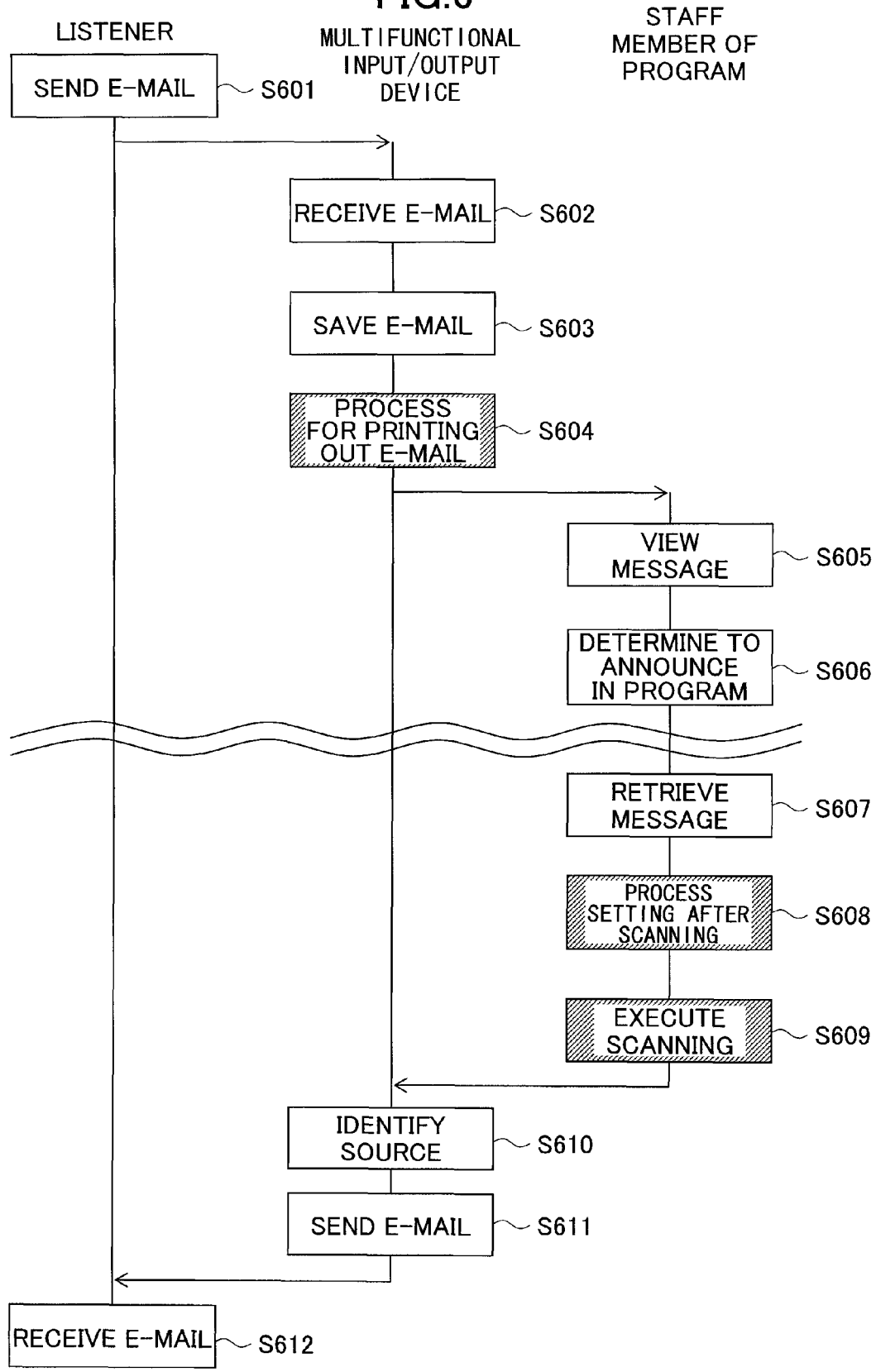
FIG. 6 illustrates an example of a flow of a process according to an embodiment of this disclosure.

FIG. 6 illustrates the sequential flow of a process performed among a listener, the multifunctional input/output device 1, and a staff member of the program. The listener sends a message to the program by e-mail. The multifunctional input/output device 1 performs a predetermined process on the received e-mail, and prints out the e-mail. The staff member scans the two dimensional code attached to the printout, so that a predetermined process is performed. Details are described below.

In step S601, the listener sends an e-mail from his own terminal to the program. The transmitted e-mail is stored in the mail box 502 of the mail server 501 (the mail server 501 is not shown in FIG. 6). In steps S602 and S603, the multifunctional input/output device 1 receives the e-mail from the mail box 502 of the mail server 501, and saves the e-mail.

Figure 11:
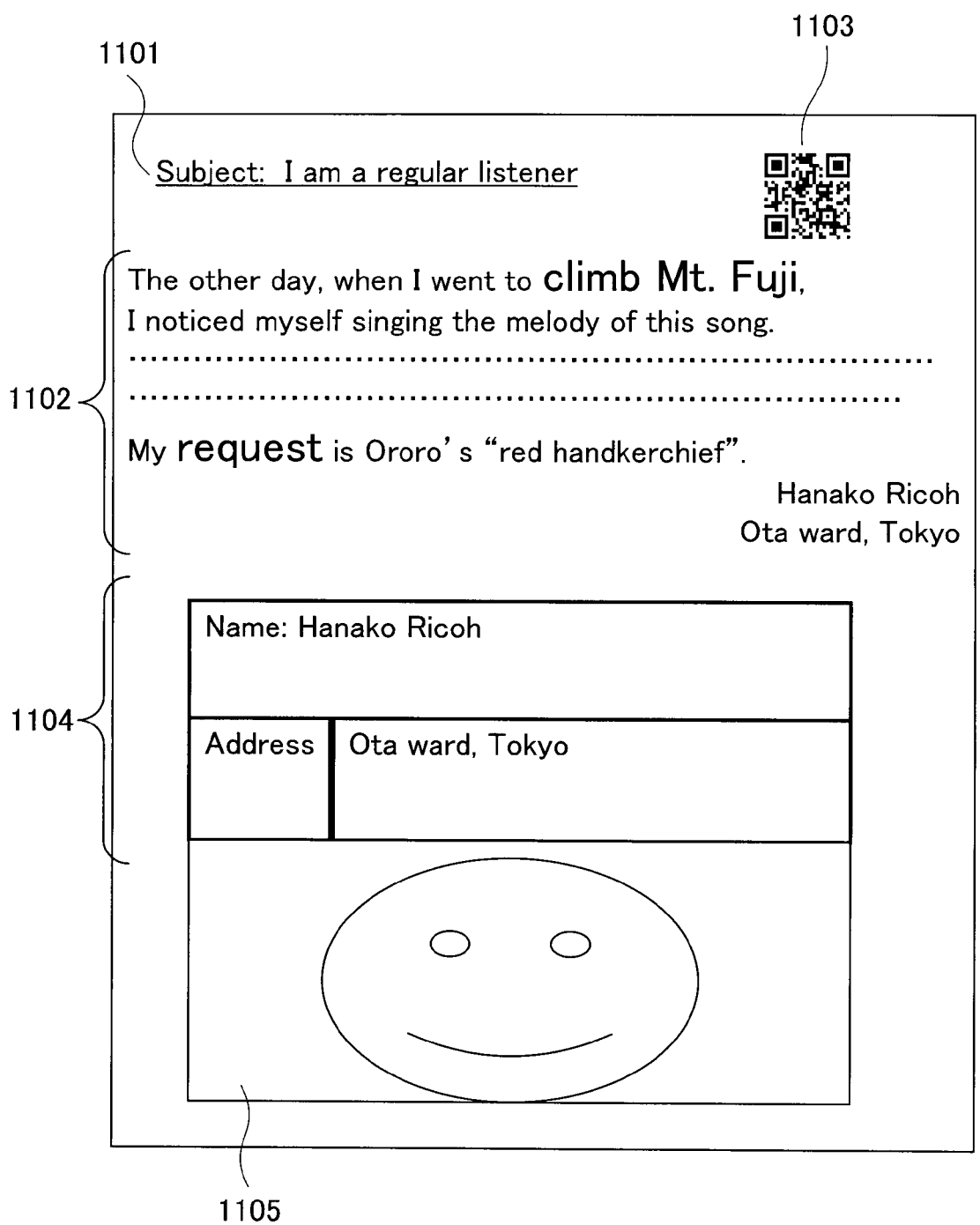
FIG. 11 illustrates an example of a printout of an e-mail that has been received.

In step S604, a process for printing out the e-mail is performed. To print out the e-mail, reference is made to a junk mail list held in the multifunctional input/output device 1 to confirm whether the sender's e-mail address is included in the junk mail list. Furthermore, when printing out the e-mail, a two-dimensional code is added to the print medium on which the contents of the e-mail are printed. An example of a printed out e-mail is shown in FIG. 11. The two dimensional code is included in the printout. Details of the junk mail list and the two dimensional code are given below.

Figure 8:
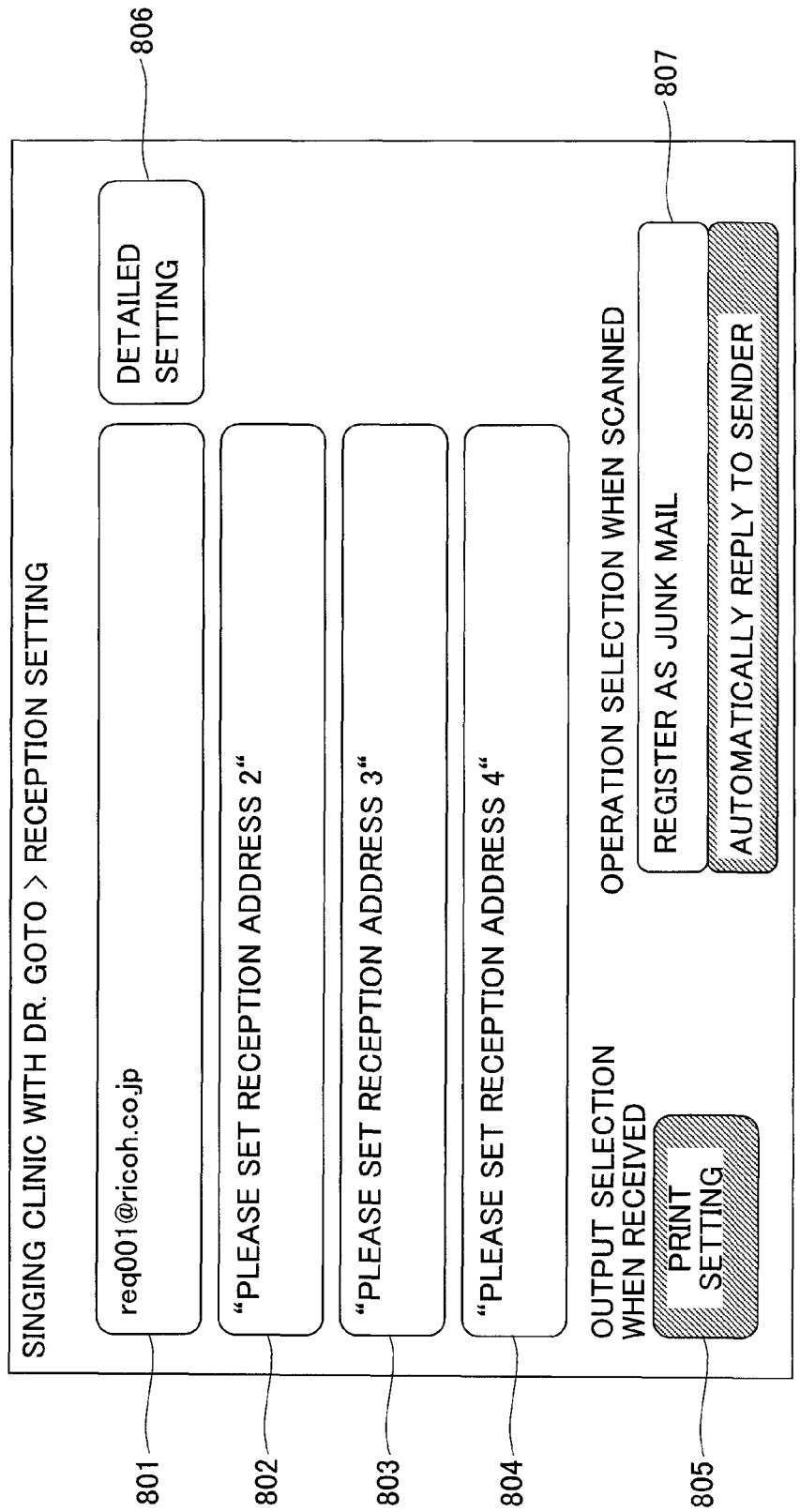
FIG. 8 illustrates an example of a setting screen of a display panel.

The staff member views the message at step S605, and determines to announce this message in the program at step S606. After the program ends, at step S607, the staff member retrieves the printout of the message announced in the program. A thank-you note is to be sent by e-mail to the listener whose message had been announced in the program. At step S608, a setting is made for the process performed to scan the two dimensional code on the printout. In this example, e-mail transmission to the sender of the message announced in the program (thank-you e-mail) is selected. The selected state is illustrated in FIG. 8. A detailed description is given below.

In step S609, the staff member scans the two dimensional code added to the printout. In step S610, the multifunctional input/output device 1 identifies the source e-mail address of the sender of the printed e-mail based on the scanned two dimensional code, and at step S611, the multifunctional input/output device 1 sends an e-mail to the identified e-mail address of the sender. In step S612, the listener receives the e-mail. The overall flow is described above. Important steps are described in further detail.

Figure 7:
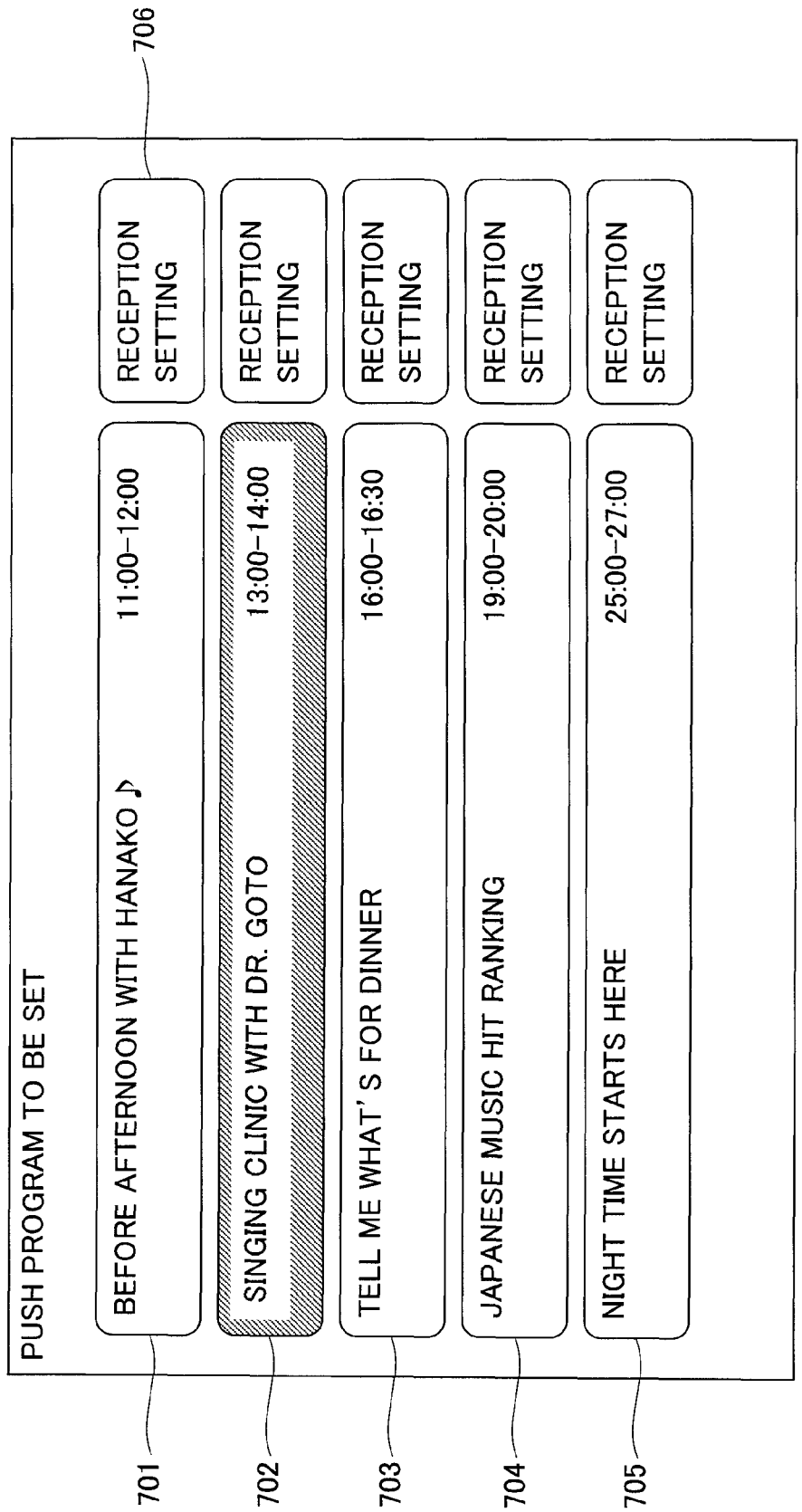
FIG. 7 illustrates an example of a setting screen of a display panel.

First, a description is given of the process of receiving the e-mail at step S602. FIG. 7 illustrates a user interface screen (panel P) for specifying setting information for outputting the e-mail including the message. In this screen, the program for receiving e-mail messages is set. In FIG. 7, 701 through 705 denote buttons for setting the program to receive messages from listeners. The program corresponding to the pressed button is currently enabled to receive e-mail messages. At a specified time, the multifunctional input/output device 1 starts receiving e-mails, a predetermined process is performed on the received e-mails, and the e-mails are printed out. In FIG. 7, "Dr. Goto's singing clinic" denoted by 702 is enabled. The settings for receiving e-mails can be made in a next screen displayed by pressing a reception setting 706 button provided on the right side of each program name.

Next, a description is given of the process of saving the e-mails performed at step S603. FIG. 10 illustrates saved e-mails that have been received by the multifunctional input/output device 1. An ID 1001 is given to each of the received e-mails as the only number for identifying the e-mail. This ID 1001 is determined by an automatic numbering function of the multifunctional input/output device 1 when registering the e-mail in the database. A reception time 1002 is when the mail server 501 had received the e-mail, which reception time 1002 is acquired from the e-mail header. A reception e-mail address 1003 is the e-mail address at which the e-mail was received. This is used when plural e-mail addresses are provided as the destination for sending messages for a single program, and it is necessary to identify the address at which an e-mail has been received. A sender address 1004 is the e-mail address of the sender, which may be an e-mail address of a personal computer or a mobile phone of the listener who sent the message. A subject 1005 and a body 1006 of a received e-mail correspond to the contents written by a listener. An attachment file 1007 is the name of a file attached to the e-mail message, such as a photograph. The attachment file is saved in a separate folder, and a file name is saved in the database as character string data for identifying the attachment file.

Next, a detailed description is given of the process of printing out the e-mail at step S604. As described above, if the sender's e-mail address is included in the junk mail list, the corresponding e-mail will not be printed out. The junk mail list can simply include e-mail addresses, and is saved in a storage device. If the character string of the sender's e-mail address completely matches that of an e-mail address in the list, the corresponding e-mail will not be printed out. If the character string of the sender's e-mail address does not completely match that of an e-mail address in the list, the corresponding e-mail will be printed out. Accordingly, any messages from a sender included in the junk mail list are prevented from being printed out. Details on updating the junk mail list are given together with the description on the scanning operation executed at step S609.

Furthermore, when printing out an e-mail, a two-dimensional code is added to the print medium on which the contents of the e-mail are printed. Information pertaining to the e-mail is embedded in this two-dimensional code. FIG. 11 illustrates a printout of the e-mail. A QR code (registered trademark) is added to the printout as the two dimensional code. In FIG. 11, 1103 denotes a QR code (registered trademark) that has been added by the multifunctional input/output device 1. Information that can be used for identifying the received e-mail in the database is encoded in the QR code (registered trademark) 1103 as a character string. FIG. 12 shows an example of character strings encoded in the QR code (registered trademark) 1103. These character strings are described in the format of XML (Xtensible Markup Language), which is widely known as a markup language. These character strings have a schema format in which "dr_goto" is inserted in a tag <programname> indicating the program name, and "F15151230" is inserted in a tag <id> indicating the ID of the database. Based on this information, the received e-mail can be identified.

Furthermore, 1101 denotes the subject of the e-mail, and 1102 denotes the body of the e-mail. In the body of the e-mail, the words "Mt. Fuji", "climbed", and "request" are bolded. This is because they have been highlighted by the multifunctional input/output device 1, and have thus been printed out in larger font sizes compared to other characters. By registering keywords beforehand, the keywords will be printed out in larger font sizes. Furthermore, 1104 denotes a region for displaying the name and address. The name and address are likely to be read by the host of the program when announcing the message, and are therefore displayed with enhanced legibility. The name and address are detected from the last two paragraphs of the body. Specifically, a paragraph including a character string corresponding to a geographical name is determined to be address information, and a paragraph including a character string corresponding to a geographical name is determined to be address information, and the rest is determined to be the name. Information corresponding to geographical names can be identified by using a map database included in the multifunctional input/output device 1. Furthermore, 1105 denotes a region for pasting image data. When an attachment file is attached to the received e-mail, and the data of the attachment file can be displayed as an image by the multifunctional input/output device 1, the image is printed out.

Next, a detailed description is given of a process setting after the scanning operation, which is performed at step S608. Step S608 is for setting the process/operations performed by the multifunctional input/output device 1 when a two dimensional code added to the printout is scanned. FIG. 8 illustrates an example of a reception setting screen. When the reception setting 706 button shown in FIG. 7 is pressed, the reception setting screen is shown. In FIG. 8, 801 through 804 denote e-mail address buttons for receiving messages from listeners. In the button 801, an e-mail address "req001@ricoh.co.jp" is set, which can be currently used for receiving e-mails. An e-mail address can be set with the use of a keyboard screen that appears by pressing the button. A print setting 805 button is for specifying the print settings at a setting screen of the printer driver. Operation selection when scanned 807 is for selecting the operation when a printout is scanned. There are two options, i.e., "register as junk mail" and "automatically reply to sender". The staff member selects either one of these options according to the purpose. In a case where "automatically reply to sender" is selected, when the tag indicating the database name and the ID is scanned from the two dimensional code, the multifunctional input/output device 1 identifies the e-mail corresponding to this information from the database shown in FIG. 10, reads the e-mail address of the sender, and sends an e-mail to the e-mail address. It is possible to send an e-mail by embedding the listener's e-mail address in the two dimensional code. However, in the present embodiment, the e-mail from the listener is first identified based on the tag indicating the database name and the ID, so that the name and other information of the listener to whom the e-mail is to be sent can be incorporated in the e-mail.

Accordingly, a reply e-mail can be easily sent by using the two dimensional code of a paper printout. Thus, when returning a thank-you e-mail to the listener whose message was announced in the program, the human user does not need to perform the task of recognizing the listener's name and his/her e-mail address from the paper printout and inputting the recognized e-mail address in a separate personal computer to send the e-mail.

By pressing a detailed setting 806 button, a detailed setting screen shown in FIG. 9 will appear. A print/send form selection 901 is for selecting the print form which becomes the layout when printing and sending the e-mail (e.g., as shown in FIG. 11). In this example, a "regular QR form" is selected. A valid receiving time 902 button is for setting the time during which e-mails can be received. A document image file save 903 button is for specifying whether to save the file attached to the received e-mail. Buttons 904 and 905 are for setting the operation to be performed when the e-mail reception time has ended. The button 904 indicates that replies will be automatically returned to received e-mails for five minutes after the e-mail reception time has ended, and the button 905 shows the body of the e-mail to be automatically returned. The listener who has received this message by a reply e-mail will know that his/her message was late for the reception time. A button 906 is for setting information for automatically sending reply e-mails to specific users. An example of this setting is a source e-mail address (e-mail address of program) used for sending a reply e-mail to a listener whose message has been announced by scanning the two dimensional code on the printed original. This source address is used for sending reply e-mails, which is different from the e-mail address to which messages are sent by listeners. A reference numeral 907 denotes the body (thank-you e-mail, etc.) of the e-mail to be sent when the two dimensional code is scanned. When "automatically reply to sender" is selected at 807, the body registered in 907 is sent to the listener by e-mail.

Second Embodiment

A description is given of a case where "register as junk mail" is selected at the selection of operation when scanned 807. FIG. 6 illustrates the flow of a case where "automatically reply to sender" is selected. When "register as junk mail" is selected, the process partially changes. FIG. 13 illustrates the flow when "register as junk mail" is selected. The steps up to step S608 are the same as those of FIG. 6, and are thus not further described. The process is different beyond step S609 after scanning is performed. After the two dimensional code is scanned at step S609, at step S1310, the multifunctional input/output device 1 acquires an e-mail address based on the two dimensional code. The method of acquiring the e-mail address is as described above. The acquired e-mail address is added to the junk mail list. From the next time, even if a message is received from this e-mail address, the message will not be printed out at the step of printing out the e-mail at step S604.

Accordingly, e-mails can be easily registered to the junk mail list by using the two dimensional code on the paper printout. The staff member of the program can determine whether to include the e-mail address of a received e-mail by looking at the contents in the printout. When there are inappropriate contents in a message, and the television/radio station desires to prohibit any subsequent e-mail messages from the corresponding e-mail address, determinations made by the mail server (for example, with a filtering function of the mail server) may be inadequate for taking flexible measures. Thus, with the conventional technology, the staff member would need to manually operate a multifunctional input/output device to add such e-mail addresses to a junk mail list.

Furthermore, in the present embodiment, the database name in which the e-mail is saved and a tag indicating the ID given to the e-mail are embedded in a QR code (registered trademark). Any code is applicable to the present invention as long as this information can be embedded in the code. For example, it is possible to use a one-dimensional barcode without the error correction function. Furthermore, information in a printout can be read by performing an OCR process.

In the present embodiment, the QR code (registered trademark) of a paper printout is used to register e-mails to the junk mail list. The list is not limited to a junk mail list; it can be a list of e-mail addresses of particular senders. That is, any e-mail list created with the use of two dimensional codes on paper printouts can be used according to the purpose.

According to an aspect of this disclosure, there is provided a multifunctional input/output device having an e-mail client function for sending/receiving e-mails to/from a mail server, the multifunctional input/output device including a storing unit configured to store a first e-mail acquired from the mail server; a printing unit configured to print the first e-mail stored by the storing unit onto a print medium and to add code information to the print medium, wherein the code information is obtained by encoding a source e-mail address of the first e-mail; a reading unit configured to read the code information printed onto the print medium by the printing unit; and an e-mail sending unit configured to send a second e-mail to the source e-mail address acquired from the code information read by the reading unit.

Additionally, according to another aspect, there is provided a multifunctional input/output device having an e-mail client function for sending/receiving e-mails to/from a mail server, the multifunctional input/output device including a first storing unit configured to store an e-mail acquired from the mail server; a second storing unit configured to store a mail list in which e-mail addresses of specific senders are registered; a printing unit configured to print the e-mail stored by the first storing unit onto a print medium and to add code information to the print medium in the event that a source e-mail address of the e-mail stored by the first storing unit is not included in the mail list, wherein the code information is obtained by encoding the source e-mail address of the e-mail; a reading unit configured to read the code information printed onto the print medium by the printing unit; and a mail list adding unit configured to add, to the mail list, the source e-mail address acquired from the code information read by the reading unit.

Additionally, according to another aspect of the aforementioned multifunctional input/output device, the code information includes a two dimensional code.

Additionally, according to another aspect, there is provided an e-mail sending method performed by a multifunctional input/output device having an e-mail client function for sending/receiving e-mails to/from a mail server, the e-mail sending method including a storing step of storing a first e-mail acquired from the mail server; a printing step of printing the first e-mail stored at the storing step onto a print medium and to add code information to the print medium, wherein the code information is obtained by encoding a source e-mail address of the first e-mail; a reading step of reading the code information printed onto the print medium at the printing step; and an e-mail sending step of sending a second e-mail to the source e-mail address acquired from the code information read at the reading step.

Additionally, according to another aspect, there is provided an e-mail sending method performed by a multifunctional input/output device having an e-mail client function for sending/receiving e-mails to/from a mail server, the e-mail sending method including a first storing step of storing an e-mail acquired from the mail server; a second storing step of storing a mail list in which e-mail addresses of specific senders are registered; a printing step of printing the e-mail stored at the first storing step onto a print medium and to adding code information to the print medium in the event that a source e-mail address of the e-mail stored at the first storing step is not included in the mail list, wherein the code information is obtained by encoding the source e-mail address of the e-mail; a reading step of reading the code information printed onto the print medium at the printing step; and a mail list adding step of adding, to the mail list, the source e-mail address acquired from the code information read at the reading step.

This disclosure is not limited to the specifically disclosed embodiment, and variations and modifications may be made without departing from the scope of this disclosure.

The present application is based on Japanese Priority Patent Application No. 2007-293493, filed on Nov. 12, 2007, the entire contents of which are hereby incorporated herein by reference.

What is claimed is:

1. A multifunctional input/output device having an e-mail client function for sending/receiving e-mails to/from a mail server, the multifunctional input/output device comprising:
   an e-mail acquiring unit configured to acquire a first e-mail from the mail server;
   a storing unit configured to store, at a database storage location identified by an ID, the first e-mail acquired from the mail server by the e-mail acquiring unit;
   a printing unit configured to print code information onto a print medium and then print the first e-mail stored by the storing unit onto the print medium having the printed code information, the code information having been generated by encoding the ID identifying the database storage location of the first e-mail, and the code information encoding the ID identifying the database storage location of the first e-mail being printed in its entirety onto the print medium;
   a reading unit configured to read the code information printed onto the print medium by the printing unit to obtain said ID, and access the database storage location identified by the ID to determine a source e-mail address of the first e-mail stored at the database storage location; and
   an e-mail sending unit configured to send a second e-mail to the source e-mail address acquired from the code information read by the reading unit.

2. A multifunctional input/output device having an e-mail client function for sending/receiving e-mails to/from a mail server, the multifunctional input/output device comprising:
   an e-mail acquiring unit configured to acquire an e-mail from the mail server;
   a first storing unit configured to store, at a database storage location identified by an ID, the e-mail acquired from the mail server by the e-mail acquiring unit;
   a second storing unit configured to store a mail list in which e-mail addresses of specific senders are registered;
   a printing unit configured to print code information onto a print medium and then print the e-mail stored by the first storing unit onto the print medium having the printed code information~in the event that a source e-mail address of the e-mail stored by the first storing unit is not included in the mail list, the code information having been generated by encoding the ID identifying the database storage location of the e-mail, and the code information encoding ID identifying the database storage location of the e-mail being printed in its entirety onto the print medium;
   a reading unit configured to read the code information printed onto the print medium by the printing unit to obtain said ID, and access the database storage location identified by the ID to determine the source e-mail address of the e-mail stored at the database storage location; and
   a mail list adding unit configured to add, to the mail list, the source e-mail address acquired from the code information read by the reading unit.

3. The multifunctional input/output device according to claim 1, wherein: the code information comprises a two dimensional code.

4. The multifunctional input/output device according to claim 2, wherein: the code information comprises a two dimensional code.

5. An e-mail sending method performed by a multifunctional input/output device having an e-mail client function for sending/receiving e-mails to/from a mail server, the e-mail sending method comprising:
- an e-mail acquiring step of acquiring a first e-mail from the mail server;
- a storing step of storing, at a database storage location identified by an ID, the first e-mail acquired from the mail server;
- a printing step of printing code information onto a print medium and then printing the first e-mail stored at the storing step onto the print medium having the printed code information,
- the code information having been generated by encoding the ID identifying the database storage location of the first e-mail, and the code information encoding the ID identifying the database storage location of the first e-mail being printed in its entirety onto the print medium;
- a reading step of reading the code information printed onto the print medium at the printing step to obtain said ID, and access the database storage location identified by the ID to determine a source e-mail address of the first e-mail stored at the database storage location; and
- an e-mail sending step of sending a second e-mail to the source e-mail address acquired from the code information read at the reading step.

6. The device according to claim 1, wherein the printing unit obtains the code information by encoding the source e-mail address of the first e-mail, after the e-mail acquiring unit acquires the first e-mail from the mail server.

7. The device according to claim 1, wherein the printing unit prints the code information onto the print medium, after the e-mail acquiring unit acquires the first e-mail from the mail server.

8. The device according to claim 1, wherein the reading unit includes a scanner configured to scan the code information printed on the print medium by the printing unit.

9. The device according to claim 1, wherein the reading unit determines the source e-mail address of the first e-mail, based on the code information printed onto the print medium by the printing unit.

10. The device according to claim 1, wherein the e-mail acquiring unit acquires the first email from the mail server, and the storing unit stores the first email acquired from the mail server by the e-mail acquiring unit, without regard to the characteristics of the first email.

11. The multifunctional input/output device according to claim 1, wherein the print medium is a sheet of paper.

12. The multifunctional input/output device according to claim 1, wherein the code information printed in its entirety onto the print medium is constituted by a two dimensional code.

13. The multifunctional input/output device according to claim 1, wherein the reading unit determines the source e-mail address of the first e-mail by determining the database storage location of the first e-mail based on the ID encoded in the code information, and accessing the first e-mail at the database storage location.

14. The multifunctional input/output device according to claim 1, wherein content of the first e-mail is printed in an un-encoded and uncompressed format together with the print code information onto the print medium.

15. The multifunctional input/output device according to claim 1, wherein content of the first e-mail is printed in a user-readable format together with the print code information onto the print medium.

* * * * *